I. KITSEE.
TELEGRAPHIC TRANSMISSION.
APPLICATION FILED JULY 25, 1914.
1,236,576.
Patented Aug. 14, 1917.
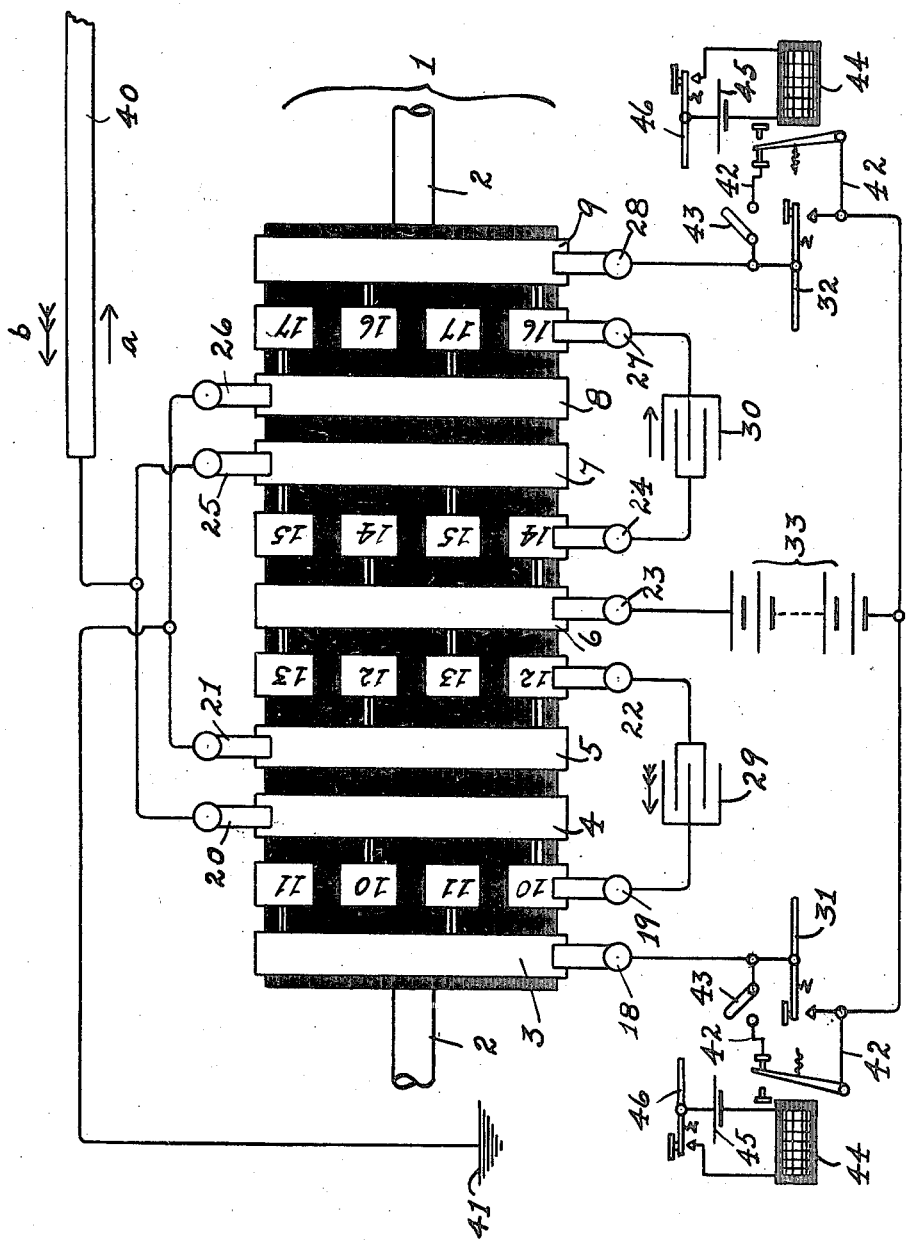

UNITED STATES PATENT OFFICE.

ISIDOR KITSEE, OF PHILADELPHIA, PENNSYLVANIA, ASSIGNOR, BY MESNE ASSIGNMENTS, TO AMERICAN TELEPHONE AND TELEGRAPH COMPANY, OF NEW YORK, N. Y., A CORPORATION OF NEW YORK.

TELEGRAPHIC TRANSMISSION.

1,236,576.  Specification of Letters Patent.  Patented Aug. 14, 1917.

Application filed July 25, 1914. Serial No. 853,079.

*To all whom it may concern:*

Be it known that I, ISIDOR KITSEE, citizen of the United States, residing at Philadelphia, in the county of Philadelphia and State of Pennsylvania, have invented certain new and useful Improvements in Telegraphic Transmission, of which the following is a specification.

My invention relates to an improvement in the transmission of telegraphic signals.

This my invention may be practised with most of the existing systems, on land lines, or on cables, but its great value is most apparent in cable telegraphy.

To illustrate one form my invention may take, I have reference to the accompanying drawing.

In this drawing, 1 is a rotatable drum as an entirety adapted to rotate with the aid of the shaft 2, either by mechanical or electrical means. The drum is provided with slip-rings 3, 4, 5, 6, 7, 8 and 9. Between the slip-rings 3 and 4 are positioned a series of segments; these segments are alternately connected to the slip-rings.

In the drawing 10, 10 are segments connected to slip-ring 4 and 11, 11 segments connected to slip-ring 3.

A second series of segments are positioned between the slip-rings 5 and 6 and are also connected alternately to one or the other of the slip-rings. In the drawing the segments 12, 12 are connected to the slip-ring 5 and the segments 13, 13 are connected to the slip-ring 6.

A third series of segments are between the slip-rings 6 and 7, and are also alternately connected to these slip-rings. In the drawing 14, 14 are connected to slip-ring 6 and 15, 15 to slip-ring 7.

A fourth series of segments are placed between slip-rings 8 and 9 and are connected alternately thereto, 16, 16 being connected to slip-ring 9 and 17, 17 to slip-ring 8.

Brush 18 rests on slip-ring 3; brush 19 is adapted to connect with the segments 10 and 11 during a rotation of the drum 1. Brush 20 rests on slip-ring 4; brush 21 rests on ring 5; brush 22 is adapted to connect with segments 12 and 13. Brush 23 rests on slip-ring 6; brush 24 is adapted to connect with segments 14 and 15. Brush 25 rests on slip-ring 7; brush 26 rests on ring 8; brush 27 is adapted to connect with segments 16 and 17, and brush 28 rests on slip-ring 9. To the brushes 20 and 25 is connected the line of transmission, here shown as a cable; and the brushes 21 and 26 are connected to the ground 41. To brushes 19 and 22 is connected the condenser 29; to the brushes 24 and 27 is connected the condenser 30; to the brush 18 are connected transmitting means here shown as the key 31 and to the brush 28 are connected transmitting means, here shown as the key 32. The lower stops of both keys are here connected together. 33 is a source of current, here shown as a battery, connected with one pole to brush 23 and with the other pole to the wire connecting the lower stops of the keys 31 and 32.

The operation of this arrangement is as follows:—Through the rotation of the drum the condenser 29 is alternately connected with the opposite poles of battery 33 when the key 31 is closed, and with the cable or line of transmission 40 and ground 41. Simultaneously with the connection of the condenser 29 to the cable 40 and ground 41, the condenser 30 is connected to the source 33 when the key 32 is closed, and simultaneously with the connecting of the condenser 29 with the source 33, the condenser 30 is connected to the cable and ground respectively. But, whereas the condenser 30 is charged in the direction of the unfeathered arrow, the condenser 29 is charged in the direction of the feathered arrow, and when therefore the condenser 30 is connected to the cable, it will discharge through the same in the direction of the unfeathered arrow *a*, and when the condenser 29 is connected to the cable and ground respectively, it will discharge through them in the direction of feathered arrow *b*. We therefore have, as long as both keys are closed, pulses of alternate direction impressed upon the line; when both keys are open, the condensers will not be charged through the source 33 and will act only as an uncharged capacity in the cable. The arrangement as described is applicable to a system, wherein normally no pulses are transmitted over the line and wherein the impression of pulses designate signals. But in some system the reverse is required, that is, normally pulses are impressed to designate that no signal is transmitted and absence or cessation of these pulses designate that a signal is transmitted.

For the first named system the keys 31 and 32 are to be used but for the second named system an arrangement has to be used whereby the circuit between the lever and contact of key 31 as well as between the lever and contact of key 32 is normally closed and is opened through depression of a transmitting lever, and this second arrangement is as follows:—42, 42 are two conducting wires connecting, with the interposition of the switch 43, the armature and back-stop of the electro-magnet 44. When the switch 43 is closed, a closed circuit is established between the lever and the lower stop of key 31. 46 is a second key connected, with the interposition of the battery 45 to the coil of the electromagnet 44. When this key is closed, the armature is drawn away from the back-stop and therefore breaks the circuit of 42. The key 32 is provided with the same arrangement as key 31.

Having now described my invention, what I claim as new and desire to secure by Letters Patent is:—

1. In combination with a telegraphic line, two condensers, unitary means to connect alternately one or the other of said condensers to said line, means to charge the disconnected condensers to required potential, and means to discharge the condenser connected to the line through said line.

2. In combination with a telegraphic line, a condenser, means to charge the condenser to the desired potential if disconnected from the line, and means to discharge said condenser when connected to said line, and rotatable means for connecting said charging and discharging means to the condenser.

3. In combination a telegraphic circuit, two commutators, a condenser for each commutator and means to charge or discharge said condenser into the circuit through its respective commutator.

4. In a device of the class described, a rotary member, means to rotate the same, a condenser, means at said rotary member to charge said condenser, and a line of transmission connected to said condenser through the rotary member after each charge.

5. A rotary member, means to rotate said member, two condensers and a line of transmission, means at said rotary member to alternately charge each condenser outside of the transmission line while the other condenser is simultaneously discharged through said line.

6. The combination with a telegraph line and means for transmitting signals thereover, of a source of current, a device for receiving a charge from said source, and automatic means to alternately render the device available for connection in regular sequence to the source and to the line.

7. The combination with a telegraph line, and means for transmitting signals thereover, of a condenser, automatic means to alternately connect the condenser to and disconnect it from the line, means to charge the condenser to the desired potential when disconnected from the line, and means to discharge said condenser when connected to the line.

8. The combination with a telegraph line and means for transmitting signals thereover, of two condensers, automatic means to alternately connect one or the other of the said condensers to the line, means to charge the disconnected condensers to the desired potential, and means to discharge the condenser connected to the line.

In testimony whereof I affix my signature in presence of two witnesses.

ISIDOR KITSEE.

Witnesses:
EDITH R. STILLEY,
J. LAURENCE McCOY.